United States Patent
Buell

[15] 3,673,562
[45] June 27, 1972

[54] ANTI-THEFT DEVICES FOR MOTORCYCLES, BICYCLES AND THE LIKE

[72] Inventor: Eugene F. Buell, Box 418, Grubbs Road R. D. #2,, Gibsonia, Pa. 15044

[22] Filed: April 29, 1970

[21] Appl. No.: 32,827

[52] U.S. Cl. .............................340/63, 180/114, 200/61.47, 200/61.52, 307/10 AT, 340/65
[51] Int. Cl. ..........................................................B62h 5/20
[58] Field of Search ..................340/65, 63, 52, 64; 180/104, 180/114, 29; 200/61.52, 61.47, 42 R; 307/10 AT

[56] References Cited

UNITED STATES PATENTS

| | | |
|---|---|---|
| 1,305,352 | 6/1919 | Gettell ......................................340/65 |
| 2,503,449 | 4/1950 | Murray ...................................180/104 |
| 2,692,652 | 10/1954 | Wilson..................................200/61.47 |
| 550,229 | 11/1895 | McDonald et al. ......................340/52 |

Primary Examiner—John W. Caldwell
Assistant Examiner—Glen R. Swann, III
Attorney—Buell, Blenko & Ziesenheim

[57] ABSTRACT

In an anti-theft device for a motorcycle or the like, a key-operated interrupt switch and a normally open solenoid switch are in series between a power source and a signal means. A tilt switch is provided parallel to the interrupt switch and solenoid switch such that, if the motocycle is tilted while the interrupt switch is closed, the signal means is actuated and the solenoid switch closed to maintain the actuation. The tilt switch is carried from a normally-inoperative to a normally operative position as the interrupt switch is moved from its open to its closed position.

3 Claims, 5 Drawing Figures

PATENTED JUN 27 1972 3,673,562
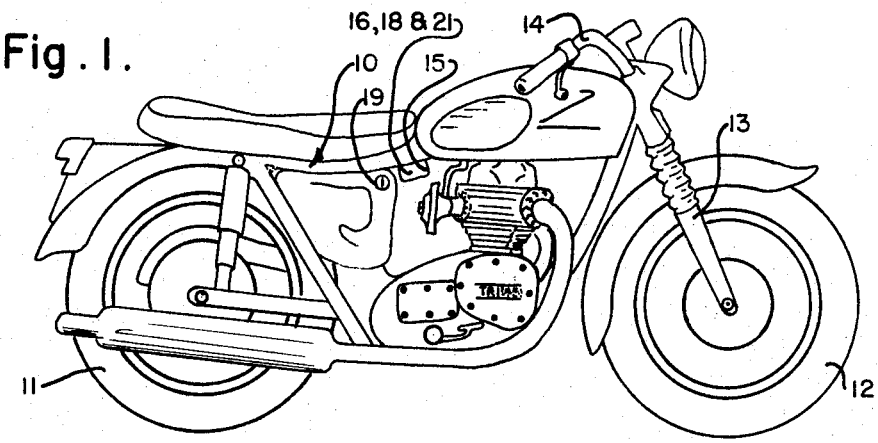
Fig. 1.
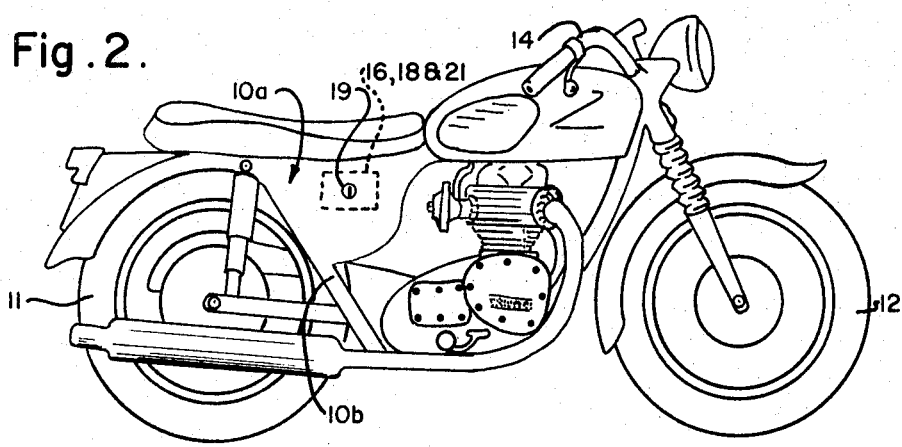
Fig. 2.
Fig. 3.
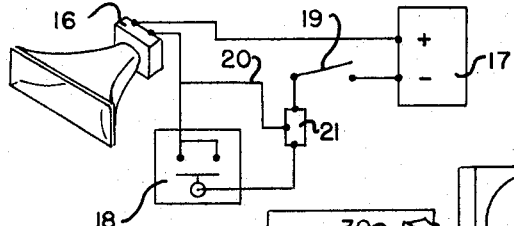
Fig. 5.
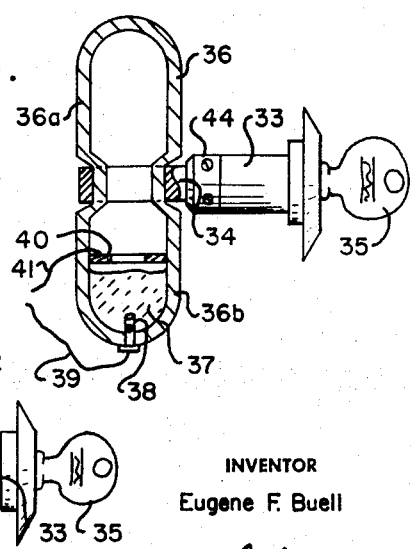
Fig. 4.
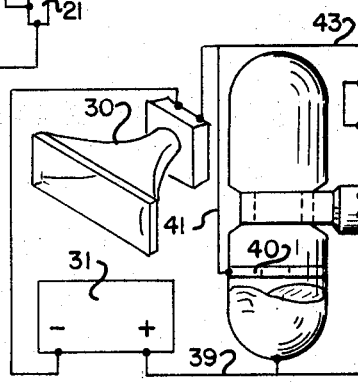
INVENTOR
Eugene F. Buell

ANTI-THEFT DEVICES FOR MOTORCYCLES, BICYCLES AND THE LIKE

This invention relates to anti-theft devices for motorcycles, bicycles and the like and particularly to a device which provides an audible signal in case of attempted theft of a motorcycle, bicycle or the like device.

The incidence of theft of motorcycles, bicycles and the like is very high, particularly in urban areas where gangs of professional thieves operate with trucks and lift mechanisms so that the time honored practice of locking a wheel or the steering or any other of the old familiar methods of preventing theft of a motorcycle or bicycle are not effective, since the machine is simply loaded onto a truck and carried away so that the lock mechanism can be removed at the thieves leisure. As a result, there is virtually no satisfactory way to prevent theft.

I have invented a device which makes it impossible to move a bicycle or motorcycle when the warning device is set.

Preferably, I provide in combination with a frame for a motorcycle, bicycle or the like, a tilt actuated switch, an audible signal means, a power source connected to the signal means through said tilt actuated switch and a lock controlled circuit interrupter switch in the connection between the signal means and power source whereby the connection can be closed or interrupted. The tilt switch is preferably a mercury switch and the signal means is prefera-bly an electrically actuated siren. The interrupter switch is preferably a simple on-off switch controlled through a key operated lock similar to an ignition lock and in the case of a motorcycle, preferably operated by the same key as the ignition lock. Preferably, the tilt switch is one which operates when its angle is changed in any direction.

In the foregoing general statement of my invention, I have set out certain objects, purposes and advantages of my invention. Other objects, purposes and advantages of my invention will be apparent from a consideration of the following description and the accompanying drawings in which:

FIG. 1 is a side elevational view of a motorcycle embodying my invention;

FIG. 2 is a side elevational view of a motorcycle embodying a second embodiment of my invention;

FIG. 3 is a schematic wiring diagram of an anti-theft device according to my invention;

FIG. 4 is a schematic wiring diagram of a second embodiment of anti-theft device according to my invention; and FIG. 5 is a section through the combination lock and tilt switch used in the embodiment of FIG. 4.

Referring to the drawings, I have illustrated a typical motorcycle frame 10 carrying wheels 11 and 12, a front fork 13 and handlebars 14. A housing 15 is fixed to the frame 10 on the top horizontal bar. The housing is fixed by welding to the frame or by attaching with non-removable bolts within the housing 15. I provide an electrically operated siren 16 or like audible signal means as shown in FIG. 3 connected to a source of electrical energy 17 such as a battery. The connection from the battery to the signal means is through a tilt switch 18 which normally holds the connection open but on tilting of the frame connects the battery to the signal means so that any movement of the frame 10 will cause the tilt switch to actuate and energize the alarm. An interrupter switch 19 is provided in the line with the tilt switch so that the line can be completely opened and the signal prevented from operating when the lock is opened and the line is ready for operation when the lock is closed so as to prevent use of the motorcycle without sounding an alarm.

The device of the invention operates as follows. When the operator wishes to ride, he locks the switch 19 out so that the connection between the signal means 16 and battery 17 is open. When the operator stops and wishes to place the anti-theft device on alert, he simply unlocks switch 19 to the on position. This closes the connection between the siren 16 and battery 17 except for the tilt switch 18 which is open and ready to operate. When anyone attempts to move the frame 10, the tilt switch 18 is actuated, closing the circuit to the siren 16 which gives an audible warning that the motorcycle is being tampered with. Preferably, a by-pass line 20 is provided having a solenoid switch 21 which is actuated by the passage of current through the tilt switch 18 so that the signal siren 16 continues to operate, even though the tilt switch 18 returns to normal, until current is interrupted by opening the lock switch 19 with its operating key at which point the solenoid returns to its normal open position, ready for reuse.

In the embodiment of FIG. 2, I have placed the siren, tilt switch, lock switch and power connections with the main horizontal frame member 10a. The assembly could equally well be placed in any other frame member as for example, diagonal member 10b.

FIGS. 4 and 5 illustrate a second embodiment of circuit according to my invention, in which the lock switch and tilt switch are a single unit, rather than two separate units as in FIG. 3. In this embodiment, an audible signal means 30 such as a siren is connected to a power source 31 through the tilt and lock switch 32. The tilt and lock switch 32 is made up of an outer cylinder housing 33 and an inner rotatable cylinder 34 rotatable by a key 35 from a lock to an unlock position. An hour glass shaped tilt switch 36 having a cylindrical end 36a and a hemispherical end 36b is fixed to the end of rotatable cylinder 34 and is rotated from an unlocked position in which the mercury 37 is collected in hemispherical end 36b around contact 38 which extends through one end and is connected to line 39 going to battery 31. A circular electrode 40 surrounds the inner wall of the end 36b just above the mercury pool 37. This electrode 40 is connected through the wall of end 36b to line 41 which goes to the siren 30. When the frame, to which the tilt switch is connected, is tilted even slightly in any direction, the mercury 37 will contact electrode 40, thus closing the circuit from the battery to the siren. At the same time, solenoid switch 42 is energized in by-pass line 43 so that even if the tilt is eliminated, the siren will continue to operate until the cylinder 34 is rotated with key 35 to the locked position, in which the mercury passes to end 36a and the solenoid is de-energized by a mechanical switch 44, operated by cylinder 34 similar to an ignition switch.

This latter form of switch has the added advantage that it will signal passersby in the event of an accident where the cycle goes off the road. In such an event, if the cycle upsets the mercury will run back or be thrown back into the hemispherical end and activate the siren to bring assistance.

In the foregoing specification, I have set out certain preferred embodiments of my invention. However, it will be understood that this invention may be otherwise embodied within the scope of the following claims.

I claim:

1. An anti-theft device for motorcycles, bicycles and the like having a main frame comprising in combination with said main frame a signal means on said frame, a power source on said frame spaced from said signal means for actuating the same, a connection between said power source and signal means, a solenoid switch means in said connection in normally open position, a lock operated interrupter means in said connection having one position in which the said connection is interrupted and a second position in which the connection is closed and a tilt actuated switch in parallel with said lock operated interrupter and said solenoid switch means having a normal position in which the connection through said tilt switch is broken and a tilt position in which the connection through said tilt switch is closed and completed whereby when the lock operated interrupter means is in its second position and the frame is tilted, the signal means is actuated and the solenoid switch is closed, said tilt switch being carried from a normally operative to a normally inoperative position by said lock operated interrupter switch as it moves from its said second position to its said one position.

2. An anti-theft device as claimed in claim 1 wherein the signal means, power source, lock operated interrupter means and tilt switch are contained within a frame member.

3. A combination lock operated interrupter and tilt switch comprising an outer lock housing, an inner rotatable cylinder in said housing rotatable from a lock position in which a circuit connected thereto from a power source to a signal means is interrupted to an unlock position in which said circuit is closed by an insertable key means, a generally hour glass shaped tilt switch of dielectric material fixed on said rotatable cylinder and in parallel with said interrupter in said circuit from the power source to said signal means and having a generally cylindrical portion at one end and a generally hemispherical portion at the other, the two ends connected by an intermediate hollow neck portion, an electrode means in said hemispherical portion extending radially inwardly from the center of the hemispherical wall, a pool of mercury in said tilt switch adapted to surround said electrode in the locked position of the rotatable cylinder, an annular electrode within said hemispherical portion spaced slightly above the mercury whereby when the tilt switch is tilted in any direction, the mercury contacts said annular electrode, external electrical connections to each of said electrodes forming a part of a second circuit parallel to the interrupter switch, said mercury being adapted to pass through the hollow neck portion to the cylindrical portion when the rotatable cylinder is rotated to the unlock position whereby the mercury is removed from contact with the electrode.

* * * * *